3,047,638
PROCESS FOR PREPARING NITRO COMPOUNDS OF CHLORO-SUBSTITUTED ETHYLENES
Wilhelm Vogt, Knapsack, near Koln, and Klaus Gehrmann, Bonn, Germany, assignors to Knapsack-Griesheim Aktiengesellschaft, Knapsack, near Koln, Germany, a corporation of Germany
Filed Jan. 12, 1960, Ser. No. 1,950
Claims priority, application Germany Jan. 16, 1959
11 Claims. (Cl. 260—644)

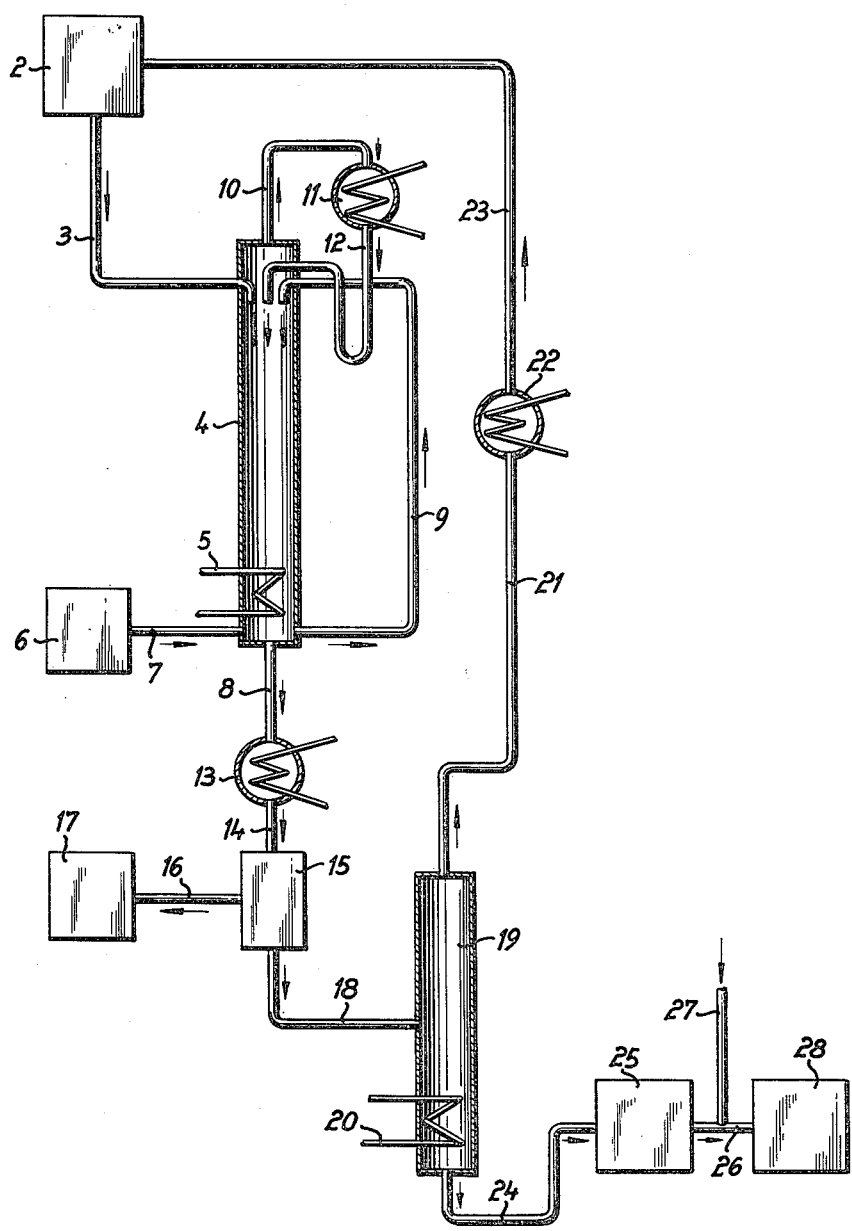

The present invention is concerned with a process for preparing nitro compounds of chloro-substituted ethylenes by reacting 1,2-dichloroethylene with nitrogen dioxide.

Organic nitro compounds of any kind are of increasing technical importance as, for example, stabilizers and dye-stuff components. Very often, however, the preparation of the nitro compounds is beset with great difficulties as, for example, in the preparation of nitro compounds of chloro-substituted ethylenes. Previously, these compounds could only be obtained via dichloracetylene and its reaction with nitrogen dioxide in ethereal solution, a process which could not be carried out on an industrial scale.

The present invention enables this disadvantage to be overcome, and provides a process for preparing nitro compounds of chloro-substituted ethylenes, wherein nitrogen dioxide is introduced into 1,2-dichlorethylene at temperatures within the range of about −20° C., to about +90° C., the crystallized oxalic acid obtained as by-product being separated, if necessary after being cooled down to 0° C. and the unreacted 1,2-dichlorethylene distilled off from the reaction product consisting of nitro compounds of mono- and dichlorethylene.

The reaction may particularly be carried out in countercurrent whereby the 1,2-dichlorethylene is introduced at the head of the reaction column, nitrogen dioxide is passed into the sump and, if desired, part of the reaction solution is continuously drawn off from the sump and reintroduced at the head of the column in a cycle. Finally, the process is advantageously carried out at the boiling temperature of 1,2-dichlorethylene, the distilling portions flowing back into the reaction zone after cooling. The nitrogen dioxide is only introduced in such quantities as are dissolved or undergo reaction.

The reaction components can continuously be fed or introduced and the reaction solution can be drawn off in the same continuous manner from the reaction zone, for example, from the sump of the reaction column, the 1,2-dichlor-ethylene which, after separation of the oxalic acid, has been separated from the reaction products by distillation, being recycled into the starting reaction after cooling.

The reaction product obtained consists of a mixture of 1,2-dichloro-1-nitro-ethylene and the dimer of monochloro-nitro-ethylene.

The 1,2-dichloro-1-nitro-ethylene is a yellowish liquid causing strong lacrimatory irritation which boils at 57–58° C. under a pressure of 25 mm. Hg.

The analysis gave the following values:

| | found, percent | calculated percent |
|---|---|---|
| C | 16.71 | 16.9 |
| H | 0.77 | 0.7 |
| N | 9.83 | 9.86 |
| Cl | 50.23 | 50.0 |
| O | rest | rest |

This compound has already been prepared from 1,2-dichlor-acetylene and nitrogen dioxide.

The dimer of a mono-chloro-nitro-ethylene has not been previously described in the literature. This compound is obtained in dissolved form in 1,2-dichloro-1-nitro-ethylene and is in the form of colourless crystals which are obtained by removing the solvent by distillation. From the high melting point of 120° C. and the result of dissolving tests showing a blue coloration, there can be concluded that the crystals obtained are the dimer of a monochloro-nitro-ethylene. At a temperature above 130° C. the crystals are liable to decompose explosively. Usual determinations of the molecular weight indicate the monomeric state since thereby the compound obviously dissociates. The analysis gave the following values:

| | found, percent | calculated, percent |
|---|---|---|
| C | 22.75 | 22.35 |
| H | 2.25 | 1.86 |
| N | 12.13 | 13.0 |
| Cl | 32.99 | 33.0 |
| O | rest | rest |

The amount of oxalic acid obtained as by-product is dependent upon the reaction temperature. It is not possible to indicate the exact proportions of the three compounds mentioned. With lower temperatures within the range of about −10° C. to −20° C., the formation of the oxalic acid is substantially reduced but more dimeric monochloro-nitro-ethylene is formed. The preparation of the reaction products is possible at temperatures within the range of about −20° C. to about +90° C. At −20° C., however, the reaction velocity is substantially lower than at temperatures within the range of about 0° C. to +20° C., but then, as mentioned above, there are less undesired side reactions. The reaction at higher temperatures involves the disadvantage of an increased formation of oxalic acid, this drawback, however, being compensated by the constant progress of the exothermic reaction and the better dissipation of heat by means of boiling 1,2-dichlorethylene. The quantity of 1,2-dichloro-1-nitro-ethylene obtained is about the same, irrespective of the temperature used and amounts to 60 to 80 by weight calculated on the desired final product.

Finally, it is advisable not to complete the reaction between 1,2-dichlorethylene and nitrogen dioxide but to terminate it at a degree of reaction of less than about 50%, for example, from about 30 to 50%. In this manner, the reaction heat can be better dissipated by the boiling dichlorethylene which is still present. In the continuous procedure, the dichlorethylene is always present in a permanent excess. The oxalic acid is easily separated from the cooled reaction mixture. The remaining solution is preferably freed from the dichlorethylene under reduced pressure, whereupon the dichlorethylene distilled off is then recycled for further reaction with nitrogen dioxide. The liquid obtained as distillation residue is generally of a yellowish-red coloration; it consists of the desired mixture of the nitro compounds of mono- and dichlorethylene.

If desired, the process may also be carried out under reduced or increased pressure, for example, at pressures within the range of about 0.1 to 2 atmospheres (absolute). In general the reaction is carried out at atmospheric pressure.

The flow diagram of an apparatus for carrying out the process according to the invention, by way of example, is shown in the accompanying drawing.

In the drawing, 2 represents a storage tank for the 1,2-dichlorethylene used as starting material. This 1,2-dichlorethylene is introduced via conduit 3 at the head of column 4 which may be designed as packed column. Above the bottom of column 4 there is provided a heating or cooling device 5. The gaseous nitrogen dioxide is fed from a storage tank 6, via conduit 7, into the sump of column 4.

Part of the sump product is drawn off via conduit 9 and recycled into the head of column 4 while the still unreacted dichlorethylene which distills off at the head of delivery pipe 10 is cooled in condenser 11, and then flows back into the head of column 4 via conduit 12.

The sump product is finally drawn off via bottom pipe 8, cooled down in cooler 13 and conveyed via conduit 14 to filter plant 15 where the crystallized oxalic acid is separated and collected via conduit 16 in container 17. The reaction products dissolved in the dichlorethylene flow via delivery pipe 18 into the distillation column 19 equipped with bottom heating 20. This distillation column 19 may also be designed as a packed column. The dichlorethylene distilling off flows back via a head line 21, condenser 22 and circulation pipe 23 into the storage tank 2 for the starting material.

The reaction products are drawn off from distillation column 19 via bottom pipe 24 and returned to storage tank 25. If necessary, the reaction products are conveyed from this tank via conduit 26 into an additional storage tank 28 after a solvent and diluent has previously been added thereto via conduit 27.

It is obvious that the method of carrying out the process of the present invention is not restricted to the flow diagram shown herein; many variations are possible.

The following examples are given for the purpose of illustrating the invention without limiting it thereto.

*Example 1.*—300 grams 1,2-dichlorethylene (cis or trans form or a mixture of these components) are introduced, per hour, via conduit 3 into the head of column 4. Nitrogen dioxide is admitted via conduit 7 into the sump of column 4 in such quantities that all the nitrogen dioxide is dissolved or reacted within the column. The sump is maintained at a boiling temperature between about 48° C. and 60° C. by means of heater 5.

In order to increase the reaction velocity, about 10 litres of the sump product are drawn off, per hour, and introduced via conduit 9 into the head of column 4 by means of a pump. The diclorethylene distilling off at the head of this column 4 is reintroduced, after being cooled down in condenser 11, into column 4.

A solution of the reaction products in dichlorethylene containing about 25 to 30 percent by weight of reaction products is drawn off from the sump of column 4. After being cooled down to 0° C. in cooler 13, the solution of the desired nitration products is separated in the adjacent filter plant 15 from the crystallized oxalic acid (15 grams) obtained as by-product. In the adjacent column 19, the dichlorethylene is expelled by evaporation at 50° C. and 30 mm. Hg; after condensation, it flows back into storage tank 2 for the starting material. The desired reaction product drawn off from the sump of column 19 in a total amount of 90 grams, consists of a mixture of 1,2-dichloro-1-nitroethylene and a monochloronitroethylene in dimeric form.

*Example 2.*—50 grams 1,2-dichlorethylene are introduced, per hour, via conduit 3 into the head of column 4. Nitrogen dioxide is passed into the sump of column 4 via feeder pipe 7 in such quantities that all the nitrogen dioxide is dissolved or reacted within the still and column. The sump and column are kept at temperatures within the range of 0° C. to about −10° C. by means of cooling device 5.

In order to increase the reaction velocity, about 20 litres of the sump product are drawn off per hour and introduced, via conduit 9, into the head of column 4 by means of a pump. A solution of the reaction products in 1,2-dichlorethylene, containing about 10 to 30 percent by weight of reaction products, is drawn off from the sump of column 4.

In column 19, the 1,2-dichlorethylene is separated by evaporation at 50° C. and 30 mm. Hg; after condensation, it flows back into the storage tank for the starting substance. The desired reaction product, drawn off from the sump of column 19 in a total amount of about 10 grams, consists of a mixture of 1,2-dichloro-1-nitroethylene and a dimeric monochloro-nitroethylene.

Oxalic acid need not be separated at reaction temperatures within the range of −10° C. to +10° C.; with this procedure, only small quantities are formed which cannot be separated by cooling.

*Example 3.*—The apparatus for preparing the reaction product from 1,2-dichlor-ethylene and nitrogen dioxide is operated as described in Example 2. However, the reaction is carried out under reduced pressure, and a pressure of only 0.1 atmosphere (absolute) is maintained in reaction column 4 and its still 5; the process is carried out at boiling points of about +5° C. resulting therefrom. Thus, the reaction heat is dissipated by boiling under reduced pressure.

*Example 4.*—The reaction products are prepared as described in Example 1. The pressure in column 4 and its still 5 amounts to 2 atmospheres (absolute) (1 atmosphere gauge). The boiling temperature resulting therefrom is within the range of 80° C. and +90° C. The portion of oxalic acid formed increases thereby as well as the conversion of 1,2-dichlorethylene to the desired reaction products.

We claim:

1. A process as claimed in claim 10 wherein the oxalic acid obtained as by-product is cooled to about 0° C. and separated.

2. A process as claimed in claim 10 which comprises carrying out the process in countercurrent, 1,2-dichlorethylene being introduced into the head of a reaction zone and nitrogen dioxide being introduced into the sump of said reaction zone.

3. A process as claimed in claim 3 which comprises continuously drawing off from the sump of the reaction zone part of the reaction solution and recycling this part into the head of the reaction zone.

4. A process as claimed in claim 10 which comprises carrying out the process under a pressure within the range of 0.1 to about 2 atmospheres (absolute).

5. A process as claimed in claim 10 which comprises carrying out the process at the boiling temperature of 1,2-dichlorethylene, the distilling portions being cooled and reintroduced into the reaction zone.

6. A process as claimed in claim 10 which comprises introducing nitrogen dioxide in such quantities as are dissolved and undergo reaction.

7. A process as claimed in claim 10 wherein the reaction of the 1,2-dichlorethylene with the nitrogen dioxide is terminated at a degree of conversion smaller than about 50% calculated on the 1,2-dichlorethylene used.

8. A process as claimed in claim 10 which comprises continuously feeding and introducing the reaction components and continuously withdrawing the reaction solution from the sump of the reaction zone, separating the oxalic acid formed, separating the 1,2-dichlorethylene from the reaction products by distillation, cooling said 1,2-dichlorethylene and recycling it into the starting reaction.

9. A process as claimed in claim 11 which comprises introducing the nitrogen dioxide into 1,2-dichlorethylene in such quantities as are dissolved and undergo reaction, and terminating the reaction at a degree of conversion within the range of 30 to 50% calculated on the 1,2-dichlorethylene used.

10. A process for preparing nitro compounds of chloro-substituted ethylenes which comprises reacting nitrogen dioxide with 1,2-dichloroethylene at temperatures within the range of about −20° C. to about +90° C. to form a reacting mixture consisting of nitro compounds of mono- and dichloroethylene, oxalic acid and some unreacted 1,2-dichloroethylene, cooling the mixture, separating crystallized oxalic acid from the mixture, and distilling off unreacted 1,2-dichloroethylene, whereby a mixture consisting of nitro compounds of mono- and dichloroethylene is obtained as residue of distillation.

11. A process for preparing nitro compounds of chloro-substituted ethylenes selected from the group consisting of 1,2-dichloro-1-nitroethylene and the dimeric of monochloro-nitroethylene which comprises reacting nitrogen dioxide with 1,2-dichloroethylene at the boiling temperature of 1,2-dichloro-ethylene and under atmospheric pressure to form a reaction mixture consisting of 1,2-dichloro-1-nitroethylene, dimeric monochloro-nitroethylene, oxalic acid and some unreacted 1,2-dichloro-ethylene, cooling the mixture, separating crystallized oxalic acid, and distilling off the unreacted 1,2-dichloroethylene, whereby a mixture consisting of 1,2-dichloro-1-nitroethylene and dimeric monochloro-nitroethylene is obtained as residue of distillation.

References Cited in the file of this patent

UNITED STATES PATENTS

| | | |
|---|---|---|
| 2,447,504 | Hass | Aug. 24, 1948 |
| 2,621,205 | Doumant et al. | Dec. 9, 1952 |
| 2,770,657 | Hively | Nov. 13, 1956 |
| 2,928,883 | Bachman et al. | Mar. 15, 1960 |
| 2,933,535 | Bachman et al. | Apr. 19, 1960 |

UNITED STATES PATENT OFFICE
CERTIFICATE OF CORRECTION

Patent No. 3,047,638                                           July 31, 1962

Wilhelm Vogt et al.

It is hereby certified that error appears in the above numbered patent requiring correction and that the said Letters Patent should read as corrected below.

Column 4, line 35, for the claim reference numeral "3" read -- 2 --.

Signed and sealed this 12th day of February 1963.

(SEAL)
Attest:

ERNEST W. SWIDER                                    DAVID L. LADD
Attesting Officer                                      Commissioner of Patents